April 29, 1952  E. HAUG  2,595,193
BICYCLE KICK STAND
Filed Jan. 26, 1950

INVENTOR.
Edward Haug
BY
Burgess, Ryan & Hicks
ATTORNEYS

Patented Apr. 29, 1952

2,595,193

UNITED STATES PATENT OFFICE 2,595,193

BICYCLE KICK STAND

Edward Haug, Little Falls, N. Y., assignor to H. P. Snyder Manufacturing Company, Inc., Little Falls, N. Y., a corporation of New York Application January 26, 1950, Serial No. 140,624

2 Claims. (Cl. 280—301)

This invention relates to a bicycle kick stand which may be mounted onto the frame of a bicycle and which comprises a supporting member or arm which is movable either into a bicycle supporting position or into a raised position where it will not interfere with the operation of the vehicle.

A principal object of the invention is to provide a kick stand unit which will have fewer parts than conventional units and which therefore will provide economies from both a manufacturer's and a purchaser's standpoint. Besides simplifying the construction, the invention also undertakes to simplify and improve the operation of such a unit and, in addition, to improve its appearance. Other objects and advantages will become apparent from the ensuing description.

The invention may be better understood by referring to the accompanying drawings in which a preferred embodiment is shown and in which.

Figure 1:
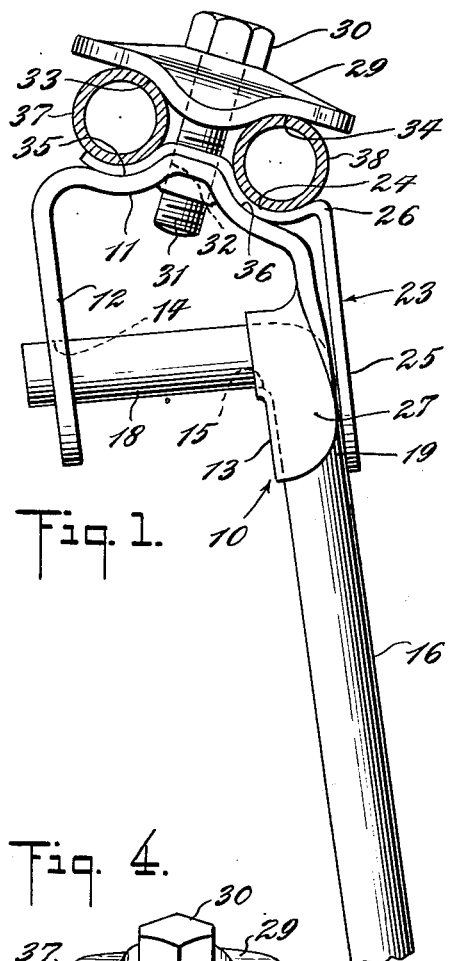
Fig. 1 is a broken side view of the kick stand unit.
Figure 2:
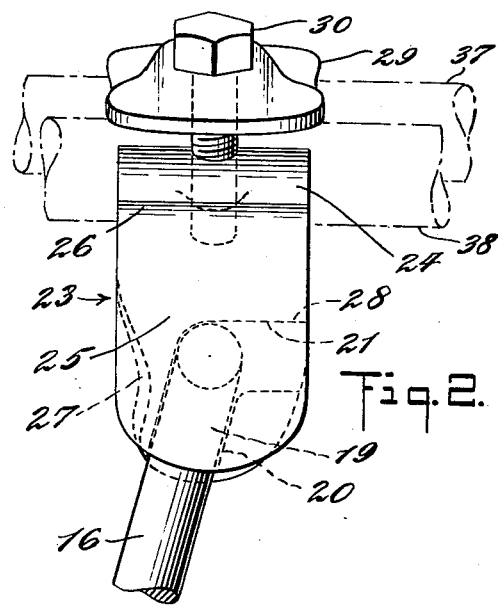
Fig. 2 is a broken-off view of the front of the stand, i. e., looking at Fig. 1 from the right side.
Figure 3:
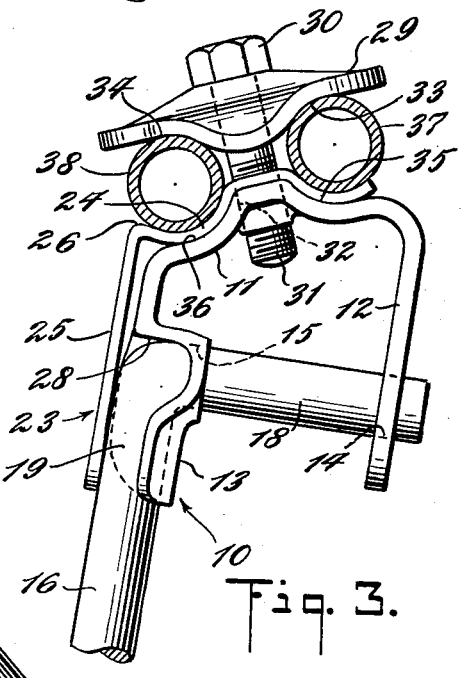
Fig. 3 is a broken-off side view taken from the side opposite that shown in Fig. 1.
Figure 4:
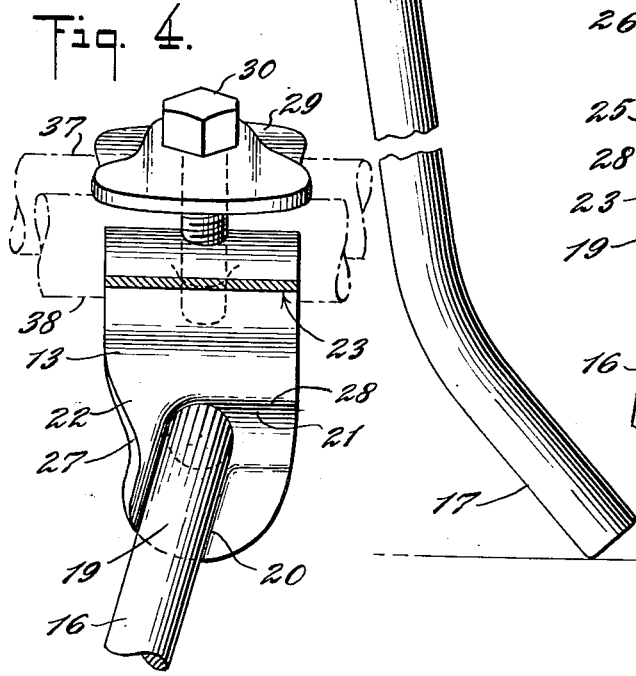
Fig. 4 is a view like Fig. 2 with a portion of the construction broken away.

The invention comprises a housing having a bicycle support member rotatably mounted thereon. Means are provided for suitably securing the housing to the frame of a bicycle. A spring element, preferably a cantilever leaf-type spring, is supported on the housing outwardly of the support member, and serves to maintain the latter in firm but rotatable engagement with the housing. The support member may be said to be forceably rotatable on the housing, the force required to turn or rotate the same against the action of the spring being applied, for example, by the user's foot.

As shown in more detail in the drawings, the housing is in the form of a body or bracket 10 having a substantially inverted U shape and comprises a plate or mounting portion 11 and inner and outer hangers 12, 13 depending therefrom. The hangers have apertures 14, 15, respectively. The support member comprises a relatively long rod 16, outwardly curved at its lower end 17 and having a short shaft portion 18 formed at substantially a right angle to the upper end thereof. As shown, the shaft 18 extends through the apertures 14, 15 and is rotatable therein.

Means are provided on the outer hanger 13 for supporting the upper part 19 of rod 16 either in a substantially vertical or horizontal position relative to the ground. Such means are preferably in the form of a pair of troughs 20, 21 in the outer face 22 of the hanger. The troughs extend radially from the aperture 15 with the trough 20 extending substantially vertically, referred to the ground, and the trough 21 extending substantially horizontally thereof. The part 19 of the rod 16 is disposable in one or other of the troughs, depending upon whether or not the kick stand is being used to support the vehicle.

The spring 23 comprises a mounting portion 24 supported on the plate 11 and a holding portion 25 extending downwardly along the outer face of the hanger 13. The portion 25 is adapted to act on the part 19 of the support member to maintain the latter in engagement with the housing. The spring simply rests on the housing and, as shown, substantially overlies the plate 11 and hanger 13, being substantially coextensive in length and width with said plate and hanger. Intermediate the mounting and holding portions of the spring is what for convenience will be described as a loop portion 26. As shown, the holding portion is somewhat inclined relative to the axis of rod 16, with the lower end of portion 25 being nearer to said axis and the upper end slightly more spaced therefrom. This inclination of the portion 25 enables a more uniform spring pressure to be applied to the rod 16 than if the said portion was disposed in a more nearly parallel relation to the rod; it also provides for a more easily rotatable rod. The presence of the loop 26 increases the resiliency or springiness of the spring.

The hanger 13 is provided on one edge with stop means in the form of a flange 27 which serves to limit the rotation of the support member beyond the vertical trough 20, and on the opposite edge with stop means in the form of a shoulder 28 which serves to limit the rotation of the support member beyond the trough 21. Shoulder 28 extends inwardly to some extent from the edge of the hanger. The rotation of the support member is thus confined to the space between, and including, the troughs 20 and 21.

For securing the housing to the bicycle frame, a plate 29 and a bolt 30 are provided. The bolt is threaded as at 31 to engage a threaded opening 32 in the plate 11. Both plates 29 and 11 are contoured as at 33, 34, 35, and 36 to provide a considerable area of contact with the bicycle frame, the latter being designated by the tubular members 37 and 38. The contoured shape of the mounting plates reduces their tendency to dent the tubular members because of excessive tightening of the bolt. The mounting portion 24 of the spring is contoured in the same way as plate 11 and is apertured to permit the bolt to be passed through. In assembling and mounting the kick stand, the spring is laid on plate 11 with the mounting portion 24 overlying the plate and the holding portion 25 overlying hanger 13 and the portion 19 of rod 16. The bolt is passed through the mounting plates and spring as shown and thus serves to hold the various parts of the unit together and to secure the unit to the bicycle frame. The spring is simply clamped between plate 11 and the bicycle frame.

The operation of the kick stand is conventional. The user simply kicks or presses the rod 16 with his foot between trough 20, the down position, and trough 21, the up position.

It will be appreciated that the kick stand described is composed of fewer parts than conventional stands, with consequent economies in money, material, and assembly time. Thus, there are only five parts: the bracket 10, the rod or support member 16, spring 23, plate 29, and bolt 30. No separate means are employed for initially attaching the spring to the housing. Also noteworthy is the fact that the support member is held in firm engagement with the housing solely by means of the spring 23, thereby eliminating the usual bolts, nuts, cotter pins, washers, plates and crimping steps generally employed in this connection. A further advantage of the invention is in the fact that the use of the spring 23 improves the appearance of the kick stand. The flat outer surface of the spring may be polished or plated or decorated in any desired manner and it serves to conceal the other parts of the unit.

While the invention has been described and illustrated in connection with more or less specific embodiments thereof, it will be understood that it is capable of obvious variations without departing from its scope.

In the light of the foregoing description, the following is claimed:

1. In a kick stand for a bicycle, the combination of a bracket having the shape of an inverted U, said bracket comprising a plate portion having inner and outer hangers depending therefrom, a support member for said bicycle comprising a relatively long rod outwardly curved at its lower end and having a short shaft portion formed at substantially a right angle to the upper end thereof, said hangers being apertured to rotatably receive the said shaft, said outer hanger having on its outer face a pair of troughs extending radially from its aperture, one of the troughs extending substantially horizontally, referred to the ground, and the other trough extending substantially vertically thereof, said rod adjacent the shaft thereof being disposable in one or other of said troughs, a leaf spring supported on said plate and extending downwardly along the outer face of the outer hanger, said spring being substantially coextensive in length and width with the outer hanger, a flange on one side of the outer hanger for engaging the rod adjacent the vertical trough, a shoulder on the opposite side of the outer hanger for engaging the rod adjacent the horizontal trough, said spring serving to overlie the outer hanger and that portion of the rod disposed in one of said troughs and to maintain the support member in a forceably rotatable engagement with the said hangers, said plate portion having a threaded opening therein and that portion of the spring supported thereon having an opening registering with said threaded opening, a second plate portion having an opening therein, and a threaded bolt for holding said plate portions and spring in engagement with a pair of tubular members of a bicycle frame, said tubular members being gripped on one side by the first plate portion and spring and on the other side by the second plate portion.

2. In a kick stand for a bicycle, the combination of a bracket comprising a mounting plate having inner and outer hangers depending therefrom, a support member for said bicycle comprising a rod outwardly curved at its lower end and having a shaft portion at right angles to the upper end thereof, said hangers being apertured to rotatably receive the said shaft, said outer hanger having a pair of troughs extending radially from its aperture, one of the troughs extending substantially horizontally, referred to the ground, and the other trough extending substantially vertically thereof, said rod adjacent the shaft thereof being disposable in one or other of said troughs, a spring supported on said plate and having a portion extending downwardly along said outer hanger, said spring substantially covering said plate and outer hanger and serving to maintain the support member in a forceably rotatable engagement with the said hangers, said plate and that portion of the spring supported thereon having contoured portions for engaging one side of a pair of tubular members of a bicycle frame, a second plate having contoured portions for engaging the other side of said tubular members, and means for holding said plates in engagement with the said tubular members, said contoured portion of the spring being clamped between the first-mentioned plate and the tubular members.

EDWARD HAUG.

REFERENCES CITED

The following references are of record in the file of this patent:

UNITED STATES PATENTS

| Number | Name | Date |
|---|---|---|
| 495,914 | Smart | Apr. 18, 1893 |
| 1,846,865 | Hapgood | Feb. 23, 1932 |
| 2,161,823 | Kraeft | June 13, 1939 |
| 2,308,794 | Thompson | Jan. 19, 1943 |